United States Patent [19]

Schmidtmann

[11] 4,053,927
[45] Oct. 11, 1977

[54] CHROMINANCE AMPLIFIER CONTROL CIRCUIT PROVIDING SIMULTANEOUS ADJUSTMENT OF GAIN AND DC LEVEL

[75] Inventor: Burchard Schmidtmann, Barsinghausen, Germany

[73] Assignee: Licentia Patent-Verwaltungs-G.m.b.H., Frankfurt am Main, Germany

[21] Appl. No.: 665,164

[22] Filed: Mar. 9, 1976

[30] Foreign Application Priority Data

Mar. 18, 1975 Germany .............................. 2511707

[51] Int. Cl.² .................. H04N 9/535; H04N 9/20
[52] U.S. Cl. .............................. 358/29; 358/34; 358/65
[58] Field of Search .................. 358/34, 33, 32, 29, 358/27, 64, 65, 21, 40

[56] References Cited

U.S. PATENT DOCUMENTS

| | | | |
|---|---|---|---|
| 3,062,914 | 11/1962 | Fernald et al. | 358/29 |
| 3,535,437 | 10/1970 | Willis | 358/29 |
| 3,921,205 | 11/1975 | Fujiwara et al. | 358/34 |
| 3,955,212 | 5/1976 | Engel et al. | 358/29 |

Primary Examiner—John C. Martin
Attorney, Agent, or Firm—Spencer & Kaye

[57] ABSTRACT

In a circuit for setting a chrominance signal controlling the emission of an electron beam in the picture tube of a color television receiver, the circuit including an amplifier connected to amplify the chrominance signal, with the output of the amplifier being held at a constant voltage level during each horizontal line blanking period by means of a keying pulse, and in which the amplifier is provided with a feedback path including an amplification determining resistance network, keying pulses are fed into the resistance network in such a manner that variation of the resistance presented by the network produces a simultaneous change in the gain of the amplifier and the direct voltage level of the chrominance signal at the output of the amplifier.

6 Claims, 3 Drawing Figures

CHROMINANCE AMPLIFIER CONTROL CIRCUIT PROVIDING SIMULTANEOUS ADJUSTMENT OF GAIN AND DC LEVEL

BACKGROUND OF THE INVENTION

In a color television receiver having a picture tube with cathodes for producing three electron beams for the basic colors red, green and blue, it is known to control the beam emissions by means of the three chrominance signals R, G and B. In order to obtain a perfect color picture, in particular with respect to the correct combination of the three colors, it is necessary to adjust the chrominance signals in various ways.

Initially, the chrominance signals must be adjusted with respect to their d.c. level so that their black value will be applied to the control electrode of the picture tube at that voltage value at which the beam current just begins to flow, i.e., the black value of the chrominance signal must be adjusted to the point of beam current actuation, the so-called cut-off point of the picture tube. This setting must be made individually for all three color systems and differs from picture tube to picture tube because the cut-off points fluctuate from one set to another. This setting is necessary so that the picture tube will still be dark controlled at the black signal level.

Furthermore, the amplification of the three chrominance signals must be matched correctly with one another so that all three colors will have the same intensity on the screen. This setting is necessary particularly to adapt the entirety of the circuitry to the characteristics of the picture tube and to the efficiency of the phosphors of the screen. It indicates the relationship between the beam current of a system and the brightness of the respective color produced thereby on the screen.

In the prior art color picture tubes which employ three electron guns disposed at the corners of an equilateral triangle and three separate screen grids for the three beam systems, the matching of the direct voltage position of the video signal to the cut-off points is effected by individual setting of the screen grid voltages. The setting of the gain is effected by means of two adjusters in the amplifiers for two of the chrominance signals. With these adjusters the amplification factors are set so that the brightness intensity of the three colors on the screen will be the same.

In the so-called precision-in-line (PIL) color picture tubes in which the three electron guns are not disposed at the corners of an equilateral triangle but in a horizontal plane, the three screen grids of the picture tube are connected together. Individual setting of the beam current starting point at the screen grids is thus impossible. It is therefore necessary to provide means for matching the direct voltage level of the chrominance signals to the beam current starting point in the three chrominance signal paths. Shifting of the beam current starting point in the picture tube also changes the required amplification for the chrominance signal due to the characteristics of the picture tube. Thus it is additionally necessary to provide a total of three setting possibilities for the amplification factors in the three chrominance signal amplifiers.

SUMMARY OF THE INVENTION

It is an object of the present invention to simplify setting of the beam current starting points of the picture tube so that matching of the amplification to the various picture tube characteristics occurs simultaneously.

It is a further object of the invention to simplify the additional means for setting the amplification of the chrominance signals.

These and other objects are accomplished according to the present invention, in a circuit for setting the chrominance signals controlling the picture tube of a color television receiver which includes an amplifier connected to amplify a respective chrominance signal to hold that signal at a constant voltage amplitude during each horizontal blanking period by means of a keying pulse, the amplifier being provided with a feedback path including a resistance network that determines the amplifier amplification level, by coupling a keying pulse into the resistance network in a manner such that when the network is adjusted the gain of the amplifier and the direct voltage level of the chrominance signal at the output of the amplifier will change simultaneously.

In the circuit according to the present invention a single setting unit in a chrominance signal channel simultaneously provides matching of the chrominance signal to the beam current starting point by shifting the direct Voltage level of the chrominance signal and a change in the amplification of the chrominance signal to match it to the respective characteristic of the picture tube. The means for setting the amplification of the chrominance signal then serve only to match the system to the efficiency of the picture tube, i.e., to the relationship between the beam current and the brightness of the associated phosphor on the screen. Without the circuit of the invention, three additional setting means with a wide setting range would be required for the amplification of the chrominance signals in addition to the three setting means for the black values of the chrominance signals to the beam current starting point. When the circuit of the present invention is employed, only two setting means are required in addition to the three setting means for setting the beam current starting points, in order to set the amplification of the chrominance signals, and these require only a relatively small setting range.

DESCRIPTION OF THE PREFERRED EMBODIMENTS

Figure 1:
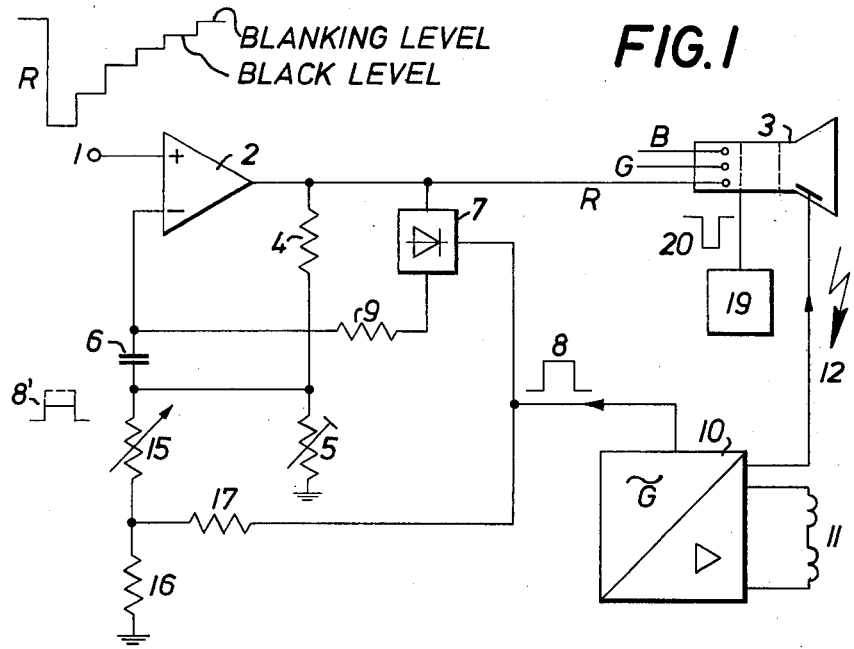
FIG. 1 is a schematic illustration of one embodiment of the present invention.

In the circuit shown in FIG. 1, a chrominance signal R is fed to the positive input terminal 1 of a differential amplifier 2 whose output is connected to the cathode of the red color gun in picture tube 3. The amplifier 2 is of the type having a very high gain, approaching infinite, and is connected with a feedback path including resistors 4 and 5 and capacitor 6 providing a very large feedback.

In a keying stage 7 the chrominance signal R is kept at a constant value during the blanking interval by means of a keying pulse 8. This value is stabilized by means of a feedback connection including a resistor 9. The keying pulse 8 always appears during the time of the blanking interval of chrominance signal R and originates from a horizontal deflection circuit 10 which also feeds horizontal deflection coils 11 and, via a line 12, furnishes the high voltage for the picture tube 3.

Figure 2:
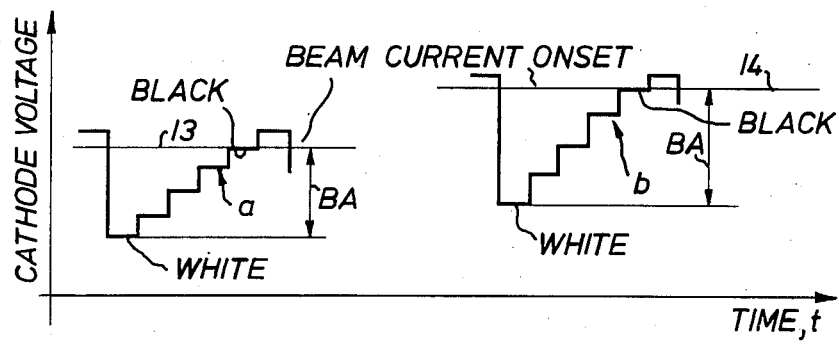
FIG. 2 is a waveform diagram showing the relationships between the beam current starting points and the chrominance signals.

FIG. 2 shows the voltage values 13 and 14 associated with waveforms a and b for the beam current starting point for two different picture tubes or two different cathodes of a single picture tube, i.e., the black level, or voltage value at the cathode of the picture tube 3 at which the beam current just begins to flow. For perfect control of the picture tube the black values of the chrominance signal must lie at these voltage values 13 and 14 for the two cases. In FIG. 2 this voltage 13 is relatively low and, in accordance with the characteristic of the picture tube, a relatively low amplitude BA results between the black value and the value of the chrominance signal a which corresponds to a white picture dot. On the other hand, the voltage value 14 associated with characteristic b for the beam current starting point at the cathode of picture tube 3 is higher. Due to the characteristics of the picture tube a higher BA amplitude results in case b for the variation between black and white. It can be seen that for matching to the various beam current starting points on the one hand, the chrominance signal R must be shifted as regards the direct voltage, while on the other hand it must also be changed in its BA amplitude.

This is accomplished in the circuit of FIG. 1 by the additional circuit including resistors 15, 16 and 17 which also receive the keying pulses.

Figure 3:
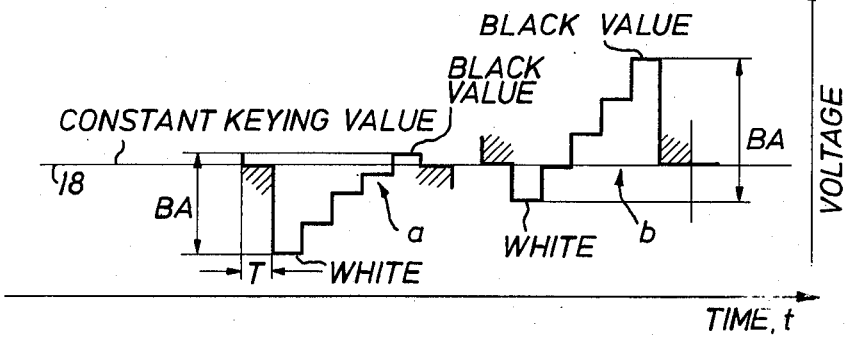
FIG. 3 is a waveform diagram showing the manner in which chrominance signals are influenced according to the present invention.

The operation of the system is explained with reference to FIG. 3. The setting of the chrominance signal R to the beam current starting point and the thus required change in amplification is effected by adjusting the value of resistor 15. To produce the voltage levels of curve a, resistor 15 is given a relatively high resistance. Thus the voltage fed back via voltage divider 4, 5 is divided but slightly, i.e., reduced little from the voltage across the entire divider, so that feedback is high and the effective gain of amplifier 2 is low. The chrominance signal has thus the desired low amplitude BA as shown for curve a in FIGS. 2 and 3. Due to the high resistance value of resistor 15, the keying pulse 8 is additionally coupled to the lower, inverting, input of amplifier 2 as a pulse 8' having a relatively low amplitude. This pulse thus determines the value of the chrominance signal R at the output of amplifier 2 during the period T of the keying pulse represented by the hatched regions in FIG. 3, i.e., during the time it is clamped to stage 7. Since the signal at the output of amplifier 2 is kept at the constant keying value 18 during this time T, the amplitude of pulse 8' determines the direct voltage position of chrominance signal R at the output of amplifier 2. In FIG. 3 this direct voltage position is illustrated by the location of curve a. The black value of the signal here lies more in the black direction than the keying value. The chrominance signal is thus shifted by the high-resistance resistor 15 to have the direct voltage position shown for curve a in FIG. 3 and is additionally set to a relatively low gain and amplitude BA.

To produce curve b of FIG. 3 resistor 15 is set to have a low resistance. Thus the voltage fed back by resistor 5 is reduced so that the effective gain of amplifier 2 and the amplitude BA must be increased. Moreover, the amplitude of pulse 8' is increased because now a larger portion of pulse 8 is fed to the lower input of amplifier 2. Because of the nature of the operation of the differential amplifier 2, an increase in the voltage at the lower input simultaneously results in a decrease of the voltage at the output during keying period T. The pulse shown to occur during time T in curve a of FIG. 3 and constituting the keying value is thus reduced. Since during this time the signal is always held at the constant keying value 18 in stage 7, the signal will shift to the position shown for curve b in FIG. 3. Thus, an increased amplitude BA and a shift of the signal in the positive direction are realized. This is exactly the effect required according to the explanation presented with reference to FIG. 2. Due to the change in the amount of feedback, the resistor 15, when it is adjusted, changes the BA amplitude and because of the different influence of the keying pulse it changes the direct voltage level of the signal at the output of amplifier 2 so that the black value comes to lie at the voltage values 13 or 14 of FIG. 2.

To summarize the conditions depicted in FIG. 3, curve a corresponds to high values for the resistance of resistor 15 and the feedback voltage to amplifier 2, low values for the effective gain of amplifier 2, the BA amplitude and the amplitude of pulse 8', and a negative shift in the direct voltage level of the chrominance signal. Conversely, curve b corresponds to low values for the resistance of resistor 15 and the feedback voltage to amplifier 2, high values for the effective gain of amplifier 2, the BA amplitude and the amplitude of pulse 8', and a positive shift in the chrominance signal direct voltage level.

In practice a respective circuit having the form described above is provided for each one of the three chrominance signals R, G and B. Resistor 5, however, need be variable only in two of these amplifiers in order to match the circuit to the different efficiencies of the beam generation systems.

The resistor 15 in FIG. 1 preferably has a positive logarithmic characteristic. Thus an almost linear dependence of the direct voltage level shift on the angle of rotation of resistor 15 is realized. The simultaneous occurrence of the coupling pulse 8' into the lower input of amplifier 2 and its storage in stage 7 required for proper operation is assured in that both actions are effected with the same pulse 8 from the horizontal line deflection circuit 10. The present invention thus utilizes the holding in stage 7 which is required in any event for the intended direct voltage level shift of the chrominance signal R when the gain is adjusted. Preferably, a settable potentiometer is also connected to the commmon screen grid of the picture tube 3 to permit presetting. Separate setting of the three beam generation systems is not possible in a precision-in-line color picture tube. This is effected by means of three resistors 15 in the three amplifiers for the chrominance signals R, G and B.

As can be seen in FIG. 3, the blanking pulse may lie between the black and white values, i.e., at a gray value and not in the ultrablack region. Therefore the blanking value defined by the keying value 18 need not necessarily effect dark control of the picture tube during retrace, or blanking. For this reason a blanking circuit 19 is additionally connected to a control electrode of the picture tube in order to positively dark key the picture tube 3 during the blanking periods by means of a negatively directed pulse 20, so that the picture tube is blocked and no retrace lines become visible. This dark keying is preferably effected at the control grid, i.e., at the Wehnelt electrode of the picture tube 3.

It will be understood that the above description of the present invention is susceptible to various modifications, changes and adaptations, and the same are intended to be comprehended within the meaning and range of equivalents of the appended claims.

What is claimed is:

1. In a circuit for use in a color television receiver, equipped with a precision-in-line color picture tube containing three electron guns disposed in a line, each gun being associated with a respective picture color and including a cathode connected to receive a respective chrominance signal associated with its respective picture color, the signal applied to the cathode controlling the amplitude of the electron beam produced by the associated gun, the circuit including three amplifiers each connected to amplify a respective chrominance signal and having an output connected to the cathode of a respective associated electron gun, the signal at the output of each amplifier being held at a constant voltage level during each horizontal blanking period by means of a keying pulse, and each amplifier being connected with a respective feedback path including an amplification determining resistance network, the resistance value of which determines the gain of its associated amplifier, the improvement wherein each said resistance network includes at least one variable resistance which is adjustable to vary the resistance presented by said network, and said circuit comprises means connected for coupling such keying pulses into each said resistance network in a manner such that variation of said variable resistance in any respective one of said networks will simultaneously produce, for said amplifier associated with said respective network, a change in the gain of said amplifier and a change in the direct voltage level of the chrominance signal at the output of said amplifier in a direction such that increases in the gain of said amplifier coincide with shifts in the direct voltage level at said amplifier output in the positive polarity direction.

2. An arrangement as defined in claim 1 wherein at least one said resistance network comprises first and second resistors connected in series between the output of its respective amplifier and ground, with the point of connection between said resistors connected in a feedback manner to the input of said respective amplifier.

3. An arrangement as defined in claim 2 wherein said at least one resistance network further comprises third, fourth and fifth resistors, said third resistor being variable and having one side connected to the point of connection between said first and second resistors, and said fourth and fifth resistors being connected in series with the point of connection therebetween being connected to the other side of said third resistor, and the series arrangment of said fourth and fifth resistors having one end connected to ground and the end connected to receive the keying pulses.

4. An arrangement as defined in claim 3 wherein said third resistor has a positive logarithmic characteristic.

5. An arrangement as defined in claim 1 wherein at least one said amplifier is a differential amplifier having a first input connected to receive the associated chrominance signal to be amplified and a second input connected to its respective feedback path.

6. An arrangement as defined in claim 1 wherein the picture tube has a control electrode and further comprising a blanking circuit for blanking the electron beam during the retrace periods connected to said control electrode.

* * * * *